(12) United States Patent
Prakah-Asante et al.

(10) Patent No.: US 7,890,263 B2
(45) Date of Patent: Feb. 15, 2011

(54) SYSTEM AND METHOD FOR SENSING AND DEPLOYMENT CONTROL SUPERVISION OF A SAFETY DEVICE

(75) Inventors: Kwaku O. Prakah-Asante, Commerce Township, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 697 days.

(21) Appl. No.: 10/907,621

(22) Filed: Apr. 8, 2005

(65) Prior Publication Data

US 2006/0226640 A1    Oct. 12, 2006

(51) Int. Cl.
*G05D 1/02* (2006.01)
(52) U.S. Cl. ............ 701/300; 701/36; 701/45; 701/46; 701/47; 701/48; 180/170; 180/167; 340/903; 340/435; 342/104; 342/118; 342/147
(58) Field of Classification Search ............ 701/36, 701/45, 46, 47, 48; 180/274
See application file for complete search history.

(56) References Cited

U.S. PATENT DOCUMENTS

| | | | |
|---|---|---|---|
| 5,697,638 A | 12/1997 | Port | |
| 5,782,737 A | 7/1998 | Warner | |
| 5,964,817 A * | 10/1999 | Dalum et al. | ............. 701/45 |
| 6,419,262 B1 * | 7/2002 | Fendt et al. | ............. 280/729 |
| 6,448,890 B1 | 9/2002 | Cooper | |
| 6,462,701 B1 | 10/2002 | Finn | |
| 6,496,764 B1 | 12/2002 | Wang | |
| 6,512,969 B1 | 1/2003 | Wang | |
| 6,517,108 B1 | 2/2003 | Vinton et al. | |
| 6,536,799 B2 | 3/2003 | Sinnhuber et al. | |
| 6,572,140 B2 | 6/2003 | Specht et al. | |
| 6,658,355 B2 | 12/2003 | Miller et al. | |
| 6,708,095 B2 | 3/2004 | Prakah-Asante et al. | |
| 6,736,425 B2 | 5/2004 | Lemon et al. | |
| 6,746,045 B2 | 6/2004 | Short et al. | |
| 6,775,605 B2 | 8/2004 | Rao et al. | |
| 6,804,595 B1 | 10/2004 | Quail et al. | |
| 6,814,372 B1 | 11/2004 | Kang et al. | |
| 6,819,991 B2 | 11/2004 | Rao et al. | |
| 2003/0060980 A1 | 3/2003 | Prakah-Asante et al. | |
| 2003/0076981 A1 | 4/2003 | Smith et al. | |
| 2003/0100982 A1 * | 5/2003 | Rao et al. | ............. 701/45 |
| 2003/0111287 A1 * | 6/2003 | Enomoto | ............. 180/274 |
| 2003/0120408 A1 * | 6/2003 | Caruso et al. | ............. 701/45 |
| 2003/0141706 A1 | 7/2003 | Lemon et al. | |
| 2004/0036261 A1 * | 2/2004 | Breed | ............. 280/735 |
| 2004/0188990 A1 | 9/2004 | Short et al. | |

* cited by examiner

*Primary Examiner*—Tuan C To
*Assistant Examiner*—Redhwan Mawari
(74) *Attorney, Agent, or Firm*—Frank A. MacKenzie; Brooks Kushman P.C.

(57) ABSTRACT

A system and method of controlling deployment of a safety device for a vehicle. The system may include a pre-impact collision assessment system, an impact detection system, and an inflatable safety device. The safety device may be partially inflated when a collision threat is detected based on a signal from the pre-impact collision assessment system. The inflatable device may be subsequently either more fully inflated or deflated.

20 Claims, 3 Drawing Sheets

SYSTEM AND METHOD FOR SENSING AND DEPLOYMENT CONTROL SUPERVISION OF A SAFETY DEVICE

BACKGROUND OF THE INVENTION

1. Field of the Invention

The present invention relates to a system and a method for sensing and deployment control supervision of a safety device for a vehicle, and more particularly to a system and method that deploys a safety device before a collision with the vehicle occurs.

2. Background Art

Motor vehicles may include one or more safety devices, such as an airbag, that are deployed to protect a vehicle occupant. Presently, frontal air-bag deployment is mainly based on information obtained from solid-state accelerometers, which sense crash conditions after impact.

It is advantageous to create the methods and systems to effectively utilize reliable sensor information for controlled airbag activation. Before Applicants' invention, an improved system and method for controlling deployment of a safety device was needed. In addition, a system and method was needed that could deploy a safety device prior to a collision and intelligently determine whether to continue or abort deployment. In addition, a system and method was needed that could deploy a safety device at multiple rates or in multiple stages to better protect vehicle occupants.

SUMMARY OF THE INVENTION

According to one aspect of the present invention, a method of controlling deployment of a safety device for a vehicle is provided. The vehicle includes a pre-impact collision assessment system and an impact detection system. The method includes the steps of detecting a target object with the pre-impact collision assessment system, determining a potential for collision between the target object and the vehicle, determining a predicted time to collision, initiating measurement of an elapsed time value, and generating a collision signal representing vehicle collision characteristics. The safety device is inflated at a first rate when a collision is detected by the pre-impact collision detection system and then inflated at a second rate when the collision signal from the impact detection system is indicative of a collision. The safety device is deflated when the collision signal is not indicative of a collision and the elapsed time value exceeds the predicted time to collision.

The safety device may be an airbag or an inflatable knee bolster. The pre-impact collision assessment system may be a radar sensing system, lidar sensing system, or a vision sensing system, or any combinations thereof.

The method may include steps of determining a degree of confidence of a potential collision with a target object and comparing the predicted time to collision to a safety device deployment time value. The safety device may be deployed at the first rate when the degree of confidence is greater than a threshold value and the predicted time to collision is less than the safety device deployment time value. The safety device deployment time value may be a function of the time to inflate the safety device and a predetermined time delay value.

According to another aspect of the present invention, a method of controlling deployment of a safety device for a vehicle is provided. The vehicle includes a pre-impact collision assessment system and an impact detection system. The method includes the steps of detecting a target object with the pre-impact collision assessment system, determining a potential for collision between the target object and the vehicle, determining a predicted time to collision, determining a degree of confidence of a potential for collision with the target object, and generating a collision signal with the impact detection system representing vehicle collision characteristics. The safety device is at least partially inflated when the degree of confidence of the collision threat exceeds a threshold value and the predicted time to collision is less than a safety device deployment time value.

According to another aspect of the present invention, a system for a safety device for a vehicle is provided. The system includes a pre-impact collision assessment system, an impact detection system, an occupant protection system, and a controller. The pre-impact collision assessment system is adapted to generate a first signal indicative of potential collision between a target object and the vehicle. The impact detection system generates a second signal indicative of actual collision characteristics. The occupant protection system includes a safety device and an inflator. The safety device has a vent. The inflator is adapted to provide an inflation gas to inflate the safety device. The controller is adapted to receive the first and second signals and control operation of the occupant protection system. The safety device is inflated at a first rate when the first signal is indicative of a potential collision threat and the second signal is not indicative of an actual collision. Subsequently, inflation gas is provided at a second rate when the second signal exceeds a severity threshold value within a predicted collision time. The vent is opened to deflate the safety device if the second signal does not exceed the severity threshold value within the predicted collision time.

The system may include a safety algorithm for generating a degree of confidence signal indicative of accuracy of the pre-impact collision assessment system.

DETAILED DESCRIPTION OF THE EMBODIMENT(S)

Figure 1:
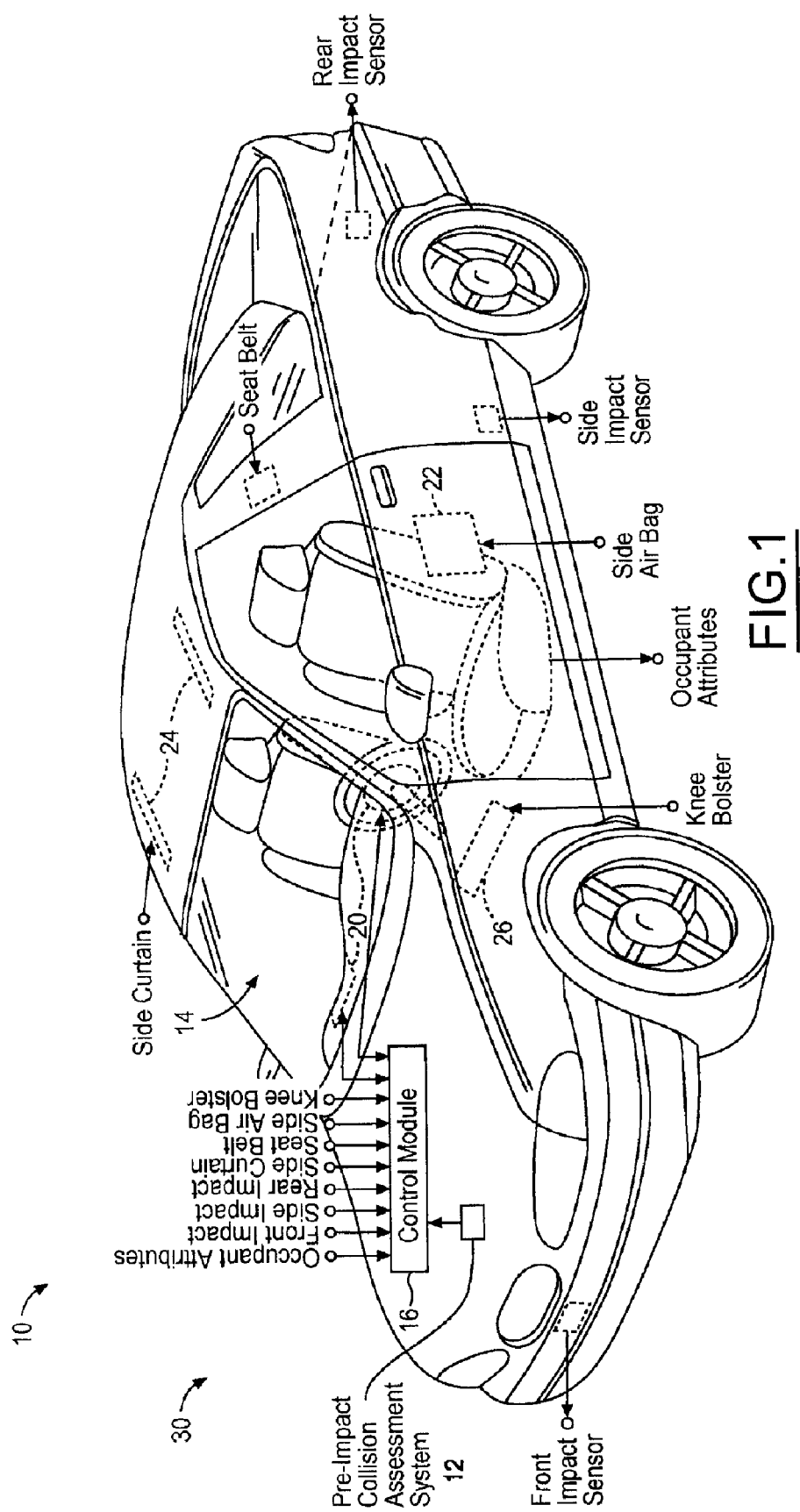
FIG. 1 is a perspective view of a vehicle having a system for controlling deployment of a safety device in accordance with one embodiment of the present invention.

Referring to FIG. 1, a schematic of a vehicle 10 is shown. The vehicle 10 may be of any suitable type, such as a car or truck. The vehicle 10 may include one or more pre-impact collision assessment systems 12, one or more occupant protection systems 14 and one or more control modules 16.

The pre-impact collision assessment system 12 is configured to detect a potential collision or impact with the vehicle 10 before it occurs. The pre-impact collision assessment system 12 may be of any suitable type. For instance, the pre-impact collision assessment system 12 may be radar, lidar, vision sensing-based, or any combinations thereof. Exemplary pre-impact collision assessment systems are described in U.S. patent application Ser. No. 10/076,405 and U.S. Pat. Nos. 6,658,355, 6,708,095, 6,775,605, and 6,819,991, assigned to the assignee of the present invention and hereby incorporated by reference in their entirety.

The occupant protection system 14 may be of any suitable type. In FIG. 1, a plurality of occupant protection systems 14 are shown, each having at least one inflatable safety device.

The inflatable safety device may be configured as an airbag, such as a front airbag 20, side airbag 22, and/or roof curtain airbag 24. In addition, the inflatable safety device may be configured as an inflatable knee bolster 26.

Figure 2:
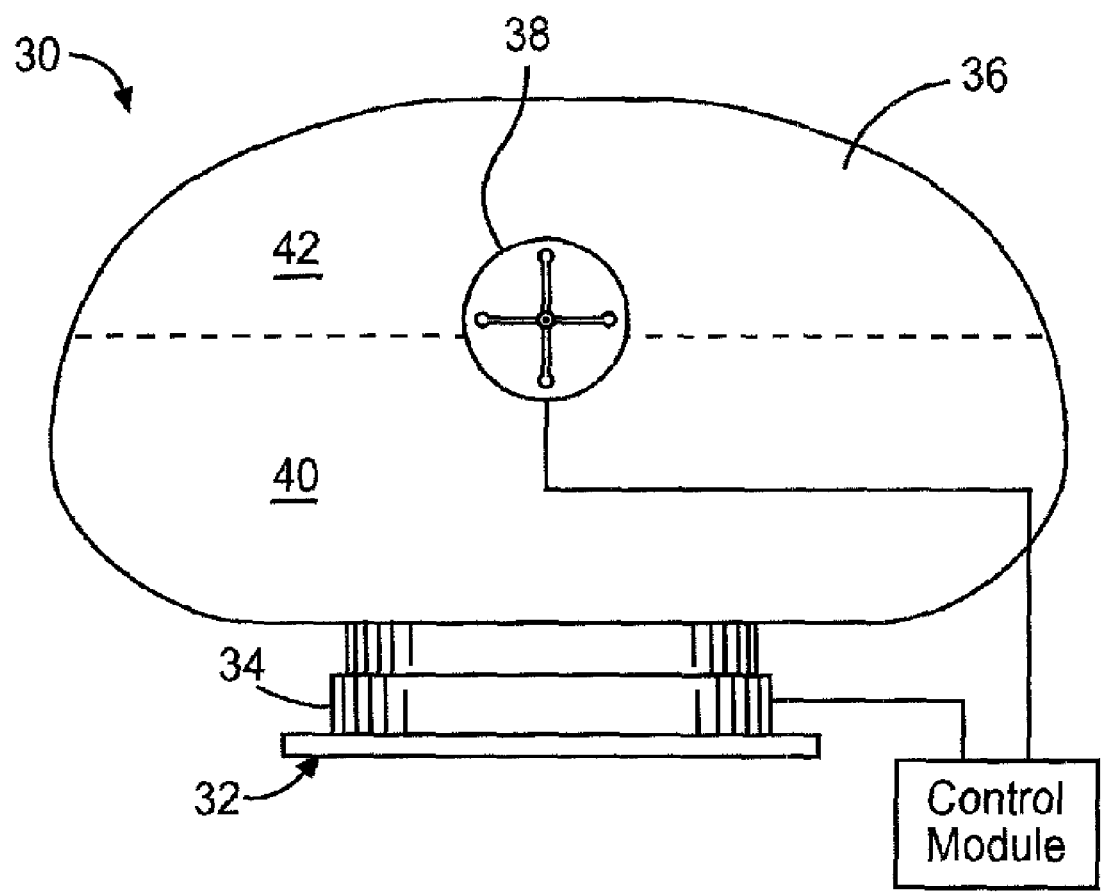
FIG. 2 is a side view of an exemplary safety device.

Referring to FIG. 2, an exemplary embodiment of an occupant protection system is shown. In this embodiment, the occupant protection system is configured as an airbag module 30 having a housing 32, an inflator 34, an airbag 36, and a venting system 38.

The housing 32 may be disposed proximate the vehicle 10 in any suitable location. For example, the housing 32 may be disposed proximate a steering wheel mount, instrument panel, seat assembly, structural member, trim panel, or headliner.

The inflator 34 is adapted to provide an inflation gas to the airbag 36. The inflator 34 may be disposed in any suitable location. In the embodiment shown, the inflator 34 is disposed proximate the housing 32. Alternatively, the inflator 34 may be spaced apart from the housing 32 and connected to the airbag 36 via a tube.

The airbag 36 may be connected to the inflator 34 in any suitable manner. For example, the airbag 36 may include an attachment feature, such as a plurality of flaps that define a pocket for receiving the inflator 34. The airbag 36 is adapted to expand from a stored condition to a deployed condition when inflation gas is provided. More specifically, the airbag 36 is deflated and concealed by an interior vehicle surface when in the stored condition and is inflated and positioned between an occupant and the interior vehicle surface when in the inflated condition.

The airbag 36 may have any suitable configuration. For example, the airbag 36 may have one or more chambers, such as a first chamber 40 and a second chamber 42 that may be inflated sequentially or simultaneously. In addition, the airbag 36 may include one or more tethers that control the shape of the airbag 36 upon deployment. The airbag 36 may be made of any suitable material and may be assembled in any suitable manner, such as by stitching, bonding, or with an adhesive. Optionally, the airbag 36 may include a friction-reducing coating disposed on an exterior surface to facilitate deployment.

The venting system 38 is adapted to selectively allow the release of inflation gas from the airbag 36. The venting system 38 may have any suitable configuration. For example, the venting system 38 may be configured as one or more vents, flaps, plugs, or structural gas channels that are associated with a portion of the airbag module 30, such as the inflator 34 or airbag 36. In the exemplary embodiment shown in FIG. 2, the venting system 38 is configured as a pyrotechnic vent that is severed to permit the release of inflation gas. Other venting systems may be employed with the present invention including, but not limited to, those described in U.S. patent application Ser. Nos. 09/683,630 and 10/709,245 and U.S. Pat. Nos. 6,736,425, 6,746,045, and 6,814,372, assigned to the assignee of the present invention and hereby incorporated by reference in their entirety.

Referring again to FIG. 1, the vehicle 10 includes a control module 16 associated with the pre-impact collision assessment system 12 and occupant protection systems 14. For simplicity, one control module is shown. However, multiple control modules may be employed to monitor and control one or more pre-impact collision assessment systems, one or more occupant protection systems, or combinations thereof.

The control module 16 may be adapted to receive signals from various sensors. For example, the control module 16 may receive signals from one or more vehicle dynamics sensors. The vehicle dynamics sensors may be configured to detect movement of the vehicle, such as vehicle translation and/or rotation. The vehicle dynamics sensors may be of any suitable type. For instance, accelerometers of any suitable type, such as piezoelectric, piezo resistive, solid state, capacitive, or silicon micromachined devices, may be employed.

In addition, the control module 16 may receive signals from one or more vehicle impact detection systems, such as front, rear, or side impact sensors that are adapted to detect a collision with the vehicle 10 or any other suitable device that senses a vehicle impact. The impact sensor may also be of any suitable type. For instance, such as an accelerometer or load detecting sensor, such as a pressure sensor that is adapted to detect load forces associated with a vehicle impact event, may be employed.

The control module 16 may also be adapted to monitor and control operation of the pre-impact collision assessment system 12 and/or occupant protection systems 14. For example, the control module 16 may receive a signal indicative of vehicle collision characteristics from the pre-impact collision assessment system 12 and control operation of various components of the occupant protective system, such as the inflator 34 and venting system 38.

Figure 3:
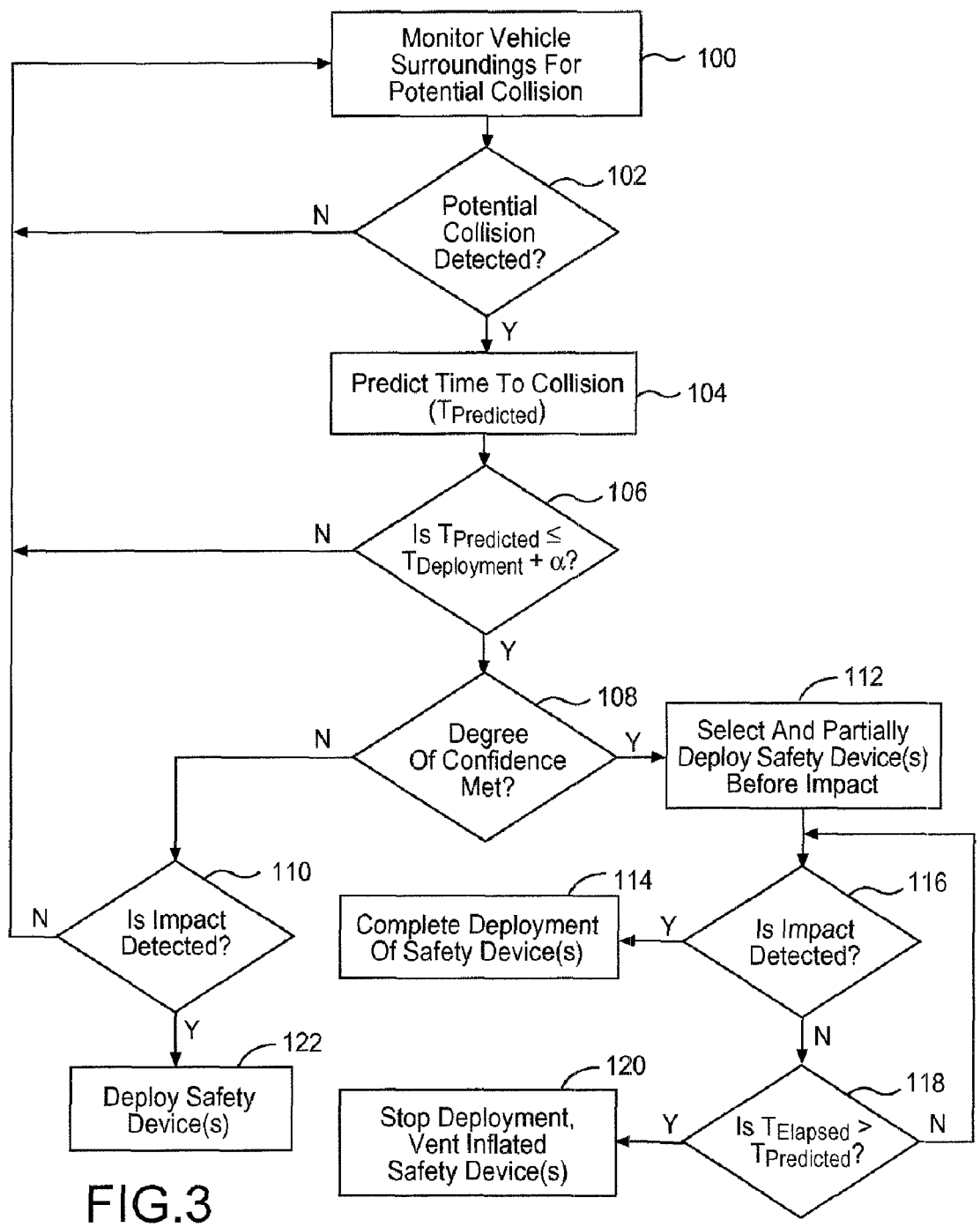
FIG. 3 is a flowchart of a method for controlling deployment of the safety device in accordance with one embodiment of the present invention.

Referring to FIG. 3, a flowchart of a method of controlling deployment of a safety device is shown. As will be appreciated by one of ordinary skill in the art, the flowchart represents control logic, which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing may be employed in real-time control applications, rather than a purely sequential strategy as illustrated. Likewise, pair processing, multitasking, or multithreaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

For convenience, the method will be described below with reference to an embodiment in which one safety device, such as an airbag, is deployed. However, this description is not meant to be limiting since the present invention contemplates the use of more than one safety device.

At 100, the method begins by monitoring the vehicle surroundings with one or more pre-impact collision assessment systems for a potential collision situation. As previously described, any suitable pre-impact collision assessment system may be employed. The pre-impact collision assessment system may obtain data indicative of attributes of a target object. In one exemplary embodiment, these target object attributes may include, but are not limited to, its relative velocity, position, and size.

At 102, the method assesses whether a potential collision is likely to occur. Any suitable assessment methodology may be employed. In one simplified embodiment, an assessment methodology may determine whether the target object is within a "threat zone" or predetermined distance from the vehicle and whether the relative velocity between the host and the target vehicles meets a relative velocity threshold. If the distance and relative velocity thresholds are met, a potential path or trajectory of the host vehicle and the target object may be determined. The trajectories may then be compared to determine if a collision is likely. If a collision is not likely, the method returns to block 100. If a collision is likely, the method continues at block 104.

At 104, a predicted time to collision, designated $T_{Predicted}$, is determined. The predicted time to collision may be based on the position and velocity attributes of the target object relative to the vehicle.

In addition to predicting a time to collision, the method may prepare the occupant protection system for the anticipated collision. A hierarchical control strategy may be used to manage deployment of one or more safety devices and meet safety performance specifications. For example, the method may determine whether the potential collision is predicted to be of sufficient magnitude for deployment of a safety device. If deployment is desirable, then the method may set target deployment parameters. These target deployment parameters may be based on anticipated collision characteristics, such as its direction, type, and severity. In addition, target deployment parameters may be based on vehicle occupant characteristics, such as location, position, size, weight, and seat belt wearing status. Additionally, the method may set targets for the inflation gas flow rate and venting. The method may also start measurement of an elapsed time value ($T_{Elapsed}$) using a timer.

At 106, the method compares the predicted time to collision ($T_{Predicted}$) to a safety device deployment time value, designated $T_{Deployment}$. The safety device deployment time value may be based on the expression:

$$T_{Deployment} = T_{Inflate} + \alpha$$

where:

$T_{Deployment}$ is the safety device deployment time value,
$T_{Inflate}$ is the time to inflate the safety device, and
$\alpha$ (alpha) is a predetermined time delay value.

The predetermined time delay value ($\alpha$) accounts for signal propagation delays and sample rate delays that may be inherent in the control logic and/or hardware. If the predicted time to collision is not less than the safety device deployment time value, then the method returns to block 100 to continue monitoring the target object and to more precisely predict potential collision attributes. If the predicted time to collision is less than the safety device deployment time value, then the method continues at block 108.

At 108, the method determines a degree of confidence associated with the assessment of collision threat. More particularly, the method determines whether there is sufficient confidence in the collision threat assessments so as to rely on these assessments as a basis for deploying a safety device. The degree of confidence may be based on statistical assessments, such as variance assessments or regression analysis, or stochastic models, such as a Kalman filter. If the degree of confidence is not met, then the method continues at block 110. If the degree of confidence is met, then the method continues at block 112.

At 110, the method employs a conventional deployment algorithm if there is insufficient confidence in the pre-crash collision assessments. More specifically, the safety device is not deployed before a vehicle impact is detected. Detection of a vehicle impact may be based on a signal from one or more impact sensors. More specifically, the impact sensor signal may be compared to a calibrated value indicative of a vehicle impact ($\Delta_{Cal}$). If an impact is not detected, the method returns to block 100. If an impact is detected, the method continues at block 122 where the safety device may be completely deployed. For example, deployment of the safety device may be accomplished by inflating a plurality of safety device chambers and/or by inflating the safety device at a high rate using a post impact deployment algorithm.

At 112, there is sufficient confidence in pre-crash collision assessments to select and partially deploy a safety device prior to impact. Safety device selection may be based on the direction or magnitude of a potential collision. Partial deployment may be conducted by inflating some, but not all, chambers of a safety device and/or by providing inflation gas at a first or slow rate that may be less than the second or high rate such as that used to complete the deployment of the safety device in block 114. Pre-collision deployment reduces the amount of time needed to complete inflation of the safety device, thereby improving occupant protection. Partial deployment may be initiated at any suitable time, such as 20 to 40 milliseconds prior to the predicted time to collision.

At 116, the method determines if an impact is detected. An impact may be detected using an impact detection system as previously described. More specifically, the impact detection system signal may be compared to a threshold value indicative of vehicle impact severity ($\Delta_{Threshold}$). The threshold value may be less than the calibrated value ($\Delta_{Cal}$) discussed above with reference to block 110. For an impact detection system configured as an accelerometer, the threshold value may be based on the expression:

$$\Delta_{Threshold} = K_1 \times (V_{Threshold} + V_{Relative}) \times K_2$$

where:

$K_1$ is a selectivity value based on variability of sensor measurements provided by the collision detection system,
$V_{Threshold}$ is a constant threshold velocity value,
$V_{Relative}$ is the velocity of the target object relative to the vehicle, and
$K_2$ is a calibrated accelerometer constant.

If an impact is detected, then the method continues at block 114 where the safety device may be inflated at a second rate or additional safety device chambers may be actuated as previously discussed. If an impact is not detected, or if the impact is below a severity threshold value then the method continues at block 118.

At 118, the method compares the elapsed time value ($T_{Elapsed}$) to the predicted time to collision ($T_{Predicted}$). If the actual time value does not exceed $T_{Predicted}$, then the method returns to block 116. If the elapsed time value exceeds $T_{Predicted}$, then the method continues at block 120.

At 120, deployment of the safety device is stopped and venting of the safety device is commenced. Deployment of the safety device may be stopped by halting the flow of inflation gas. Venting may be accomplished by activating the venting system as previously described. Venting the safety device helps the driver to safely control the vehicle, as a vented safety device provides less interference with visibility or the ability to steer the vehicle as compared to an inflated safety device.

While the best mode for carrying out the invention has been described in detail, those familiar with the art to which this invention relates will recognize various alternative designs and embodiments for practicing the invention as defined by the following claims.

What is claimed is:

1. A method comprising:
   detecting a target object with a pre-impact collision assessment system;
   determining a predicted time to collision;
   initiating measurement of an elapsed time value; and
   generating a collision signal when a threshold value is exceeded, wherein the threshold value is based on a product of a selectivity value indicative of variability of sensor measurements provided by an impact detection system, a ratio of a constant threshold velocity value and a relative velocity value indicative of velocity of the target object relative to a vehicle, and a calibrated accelerometer constant;

wherein the safety device is inflated at a first rate when a potential collision is detected by the pre-impact collision assessment system, and then inflated at a second rate when the collision signal from the impact detection system is indicative of a collision; and wherein the safety device is deflated when the elapsed time value exceeds the predicted time to collision and the collision signal is not indicative of a collision.

2. The method of claim 1 wherein the first rate is less than the second rate.

3. The method of claim 1 wherein the safety device is an airbag.

4. The method of claim 1 wherein the safety device is an inflatable knee bolster.

5. The method of claim 1 wherein the step of determining the predicted time to collision further comprises:

determining a degree of confidence of a collision threat with the target object detected by the pre-impact collision assessment system;

comparing the predicted time to collision to a safety device deployment time value; and deploying the safety device at the first rate when the degree of confidence is more than a threshold value and the predicted time to collision is less than the safety device deployment time value.

6. The method of claim 5 wherein the safety device deployment time value is based on the expression:

$$T_{Deployment} = T_{Inflate} + \alpha$$

where:

$T_{Deployment}$ is the safety device deployment time value,
$T_{Inflate}$ is the time to inflate the safety device, and
$\alpha$ a is a predetermined time delay value.

7. The method of claim 1 wherein the pre-impact collision assessment system is a radar sensing system.

8. The method of claim 1 wherein the pre-impact collision assessment system is a lidar sensing system.

9. The method of claim 1 wherein the pre-impact collision assessment system is a vision-based sensing system.

10. A method of controlling deployment of a safety device for a vehicle having a pre-impact collision assessment system and an impact detection system, the method comprising:

detecting a target object with the pre-impact collision assessment system;

determining a potential for collision between the target object and the vehicle;

determining a predicted time to collision;

determining a degree of confidence of a collision threat with the target object; and generating a collision signal with the impact detection system representing vehicle collision characteristics;

wherein the safety device is at least partially inflated when the degree of confidence of the collision threat exceeds a threshold value and the predicted time to collision is less than a safety device deployment time value; and wherein the threshold value is based on a product of a selectivity value indicative of variability of sensor measurements provided by the impact detection system, a ratio of a constant threshold velocity value and a relative velocity value indicative of the velocity of a target object relative to the vehicle, and a calibrated accelerometer constant.

11. The method of claim 10 wherein the step of determining the predicted time to collision further comprises initiating measurement of an elapsed time value, and wherein the safety device is deflated when the collision signal is indicative of a collision severity below a severity threshold value and the elapsed time value exceeds the predicted time to collision.

12. The method of claim 10 wherein the step of determining the predicted time to collision further comprises initiating measurement of an elapsed time value, and wherein the safety device is inflated at a second rate that exceeds a first rate associated with partial inflation of the safety device when the collision signal is indicative of a collision severity above a severity threshold value and the elapsed time value is less than the predicted time to collision.

13. The method of claim 10 wherein a first chamber of the safety device is inflated before the collision is detected by the impact detection system and a second chamber is inflated after a collision is detected by the impact detection system.

14. A system for controlling deployment of a safety device for a vehicle, the system comprising:

a pre-impact collision assessment system adapted to generate a first signal indicative of potential collision characteristics between a target object and the vehicle;

an impact detection system that generates a second signal indicative of actual collision characteristics;

an occupant protection system including a safety device having a vent, and an inflator adapted to provide an inflation gas to inflate the safety device; and a controller adapted to receive the first and second signals and control operation of the occupant protection system;

wherein the safety device is inflated at a first rate when the first signal is indicative of a potential collision and the second signal is not indicative of an actual collision and (1) inflation gas is provided at a second rate when the second signal exceeds a severity threshold value within a predicted collision time wherein the severity threshold value is based on a product of a selectivity value indicative of variability of sensor measurements provided by the impact detection system, a ratio of a constant threshold velocity value and a relative velocity value indicative of the velocity of a target object relative to the vehicle, and a calibrated accelerometer constant and (2) the vent is opened to deflate the safety device if the second signal is not indicative of a collision having a severity that exceeds a severity threshold value within the predicted collision time.

15. The system of claim 14 further comprising a safing algorithm for generating a degree of confidence signal indicative of accuracy of the pre-impact collision assessment system in predicting a potential collision with the target object, wherein inflation gas is initially provided at the first rate when the degree of confidence signal is greater than a confidence threshold value.

16. The system of claim 14 wherein the safety device is an airbag.

17. The system of claim 14 wherein the safety device is an inflatable knee bolster.

18. The system of claim 14 wherein the pre-impact collision assessment system is a radar sensing system.

19. The system of claim 14 wherein the pre-impact collision assessment system is a lidar sensing system.

20. The system of claim 14 wherein the pre-impact collision assessment system is a vision-based sensing system.

* * * * *